United States Patent [19]
Guiot

[11] Patent Number: 5,599,451
[45] Date of Patent: Feb. 4, 1997

[54] ANAEROBIC AND AEROBIC INTEGRATED SYSTEM FOR BIOTREATMENT OF TOXIC WASTES (CANOXIS)

[75] Inventor: Serge R. Guiot, Montréal, Canada

[73] Assignee: National Research Council of Canada, Ottawa, Canada

[21] Appl. No.: 316,482

[22] Filed: Oct. 3, 1994

[51] Int. Cl.$^6$ ........................................... C02F 3/30
[52] U.S. Cl. ................... 210/605; 210/615; 210/617; 210/630; 210/909; 210/150; 210/195.1
[58] Field of Search .................... 210/150, 151, 210/615, 617, 605, 630, 909, 614, 195.1, 199

[56] References Cited

U.S. PATENT DOCUMENTS

| | | | |
|---|---|---|---|
| 4,746,435 | 5/1988 | Onishi et al. | 210/150 |
| 4,762,612 | 8/1988 | Yoda et al. | 210/150 |
| 4,800,021 | 1/1989 | Desbos | 210/150 |
| 4,895,645 | 1/1990 | Zorich, Jr. | 210/605 |
| 5,116,506 | 5/1992 | Williamson et al. | 210/150 |
| 5,211,848 | 5/1993 | Friday et al. | 210/909 |

FOREIGN PATENT DOCUMENTS

| | | | |
|---|---|---|---|
| 243993 | 2/1990 | Japan | 210/150 |
| 4104900 | 4/1992 | Japan | 210/150 |

OTHER PUBLICATIONS

Eckenfelder, Jr., *Principles of Water Quality Management*, 1980, pp. 374–375.

Primary Examiner—Peter A. Hruskoci
Assistant Examiner—Theodore M. Green
Attorney, Agent, or Firm—J. Wayne Anderson

[57] ABSTRACT

An integrated synchronous aerobic/anaerobic bioreactor is disclosed for treating waste liquids, such as pulp and paper waste water, and to methods of treating such waste liquid. The apparatus includes a bioreactor and an external aerator for injecting a controlled amount of an oxygen-containing gas into the waste liquid as it is cycled through the apparatus. An aerobic/anaerobic biofilm is provided in the reactor, having a decreasing gradient of oxygen concentration toward its core.

20 Claims, 7 Drawing Sheets

ANAEROBIC AND AEROBIC INTEGRATED SYSTEM FOR BIOTREATMENT OF TOXIC WASTES (CANOXIS)

BACKGROUND OF THE INVENTION

1. Field of the Invention

This invention relates to bioreactors, and in particular to an integrated synchronous aerobic/anaerobic bioreactor.

Interest in anaerobic biotechnology for industrial wastewater treatment has greatly increased during the past decade, because the anaerobic process is the most elegant method to reduce carbon pollution. With minimum power requirement, anaerobic technology converts 90% of the pollutants into a valuable form (Verstraete et al., 1990)[1]. In contrast, aerobic processes transform 50% of the carbon pollution into surplus sludge which still requires other processes to deal with. However, anaerobic technology has inherent limitations. Methanogens, which are at the last stage of the anaerobic process chain, have a limited substrate affinity. As a result, anaerobic systems are inefficient in treatment polishing. In comparison, aerobic treatment permits the removal of trace organics with, in practice, a capacity of purification down to values lower than the required standards (<30 mg BOD $L^{-1}$) (Vochten et al., 1988)[2]. Furthermore, aerobic processes are recognized to have the capability to mineralize a broader range of recalcitrant compounds than anaerobic processes. For example, common compounds refractory to anaerobic treatment include some chlorinated phenolics, vinyl chlorides, resin acids, terpenes.

2. Description of the Prior Art

In all these cases where anaerobic treatment is employed, an aerobic process is also included for secondary or tertiary treatment. The objective of sequential anaerobic-aerobic system is to maximize the abatement of the chemical oxygen demand (COD) and to release an effluent that is not acutely toxic.

In most of the above cases, anaerobic transformation is thus incomplete, and less chlorinated aliphatics or aromatics are the endproducts of the anaerobic processes. In contrast, aerobic microorganisms are efficient degraders of less chlorinated organic compounds up to complete mineralization. Anaerobic digestion is thus indicated as a primary treatment step to convey less chlorinated or dechlorinated compounds-containing effluents to an aerobic polishing unit.

In such sequential treatment schemes, the anaerobic and aerobic bacteria operate in separate units that complement each other. Despite its great potential, the anaerobic/aerobic sequence has drawbacks. In some cases, anaerobic partial degradation results in products which are just as or more toxic than the primary molecule. These products can accumulate in the anaerobic stage where they could inhibit anaerobic microorganisms themselves prior to being released into the subsequent aerobic unit. This might decrease the effectiveness of the overall system from a certain feeding level.

Recently, attention has been directed to the use of a single combined anaerobic/aerobic system. For example, it is known that aerobic and anaerobic microorganisms can grow in the same habitat provided that the input of $O_2$ is lower than the potential rate of consumption, which causes $O_2$-limited environments. This is typical of biofilm systems. Limitation in the molecular diffusion of $O_2$ results in abrupt $O_2$ concentration downward gradients, leaving a large portion of the biofilm volume free of $O_2$ (Table 1). In all cases shown, over 63% of the total biomass is anaerobic.

TABLE 1

LIMITATION IN $O_2$ MASS TRANSPER IN VARIOUS TYPES OF BIOFILMS

| System | Trickling Filter Slime[a] | Mycelial pellet[b] | *Enterobacter cloacae* in alginate bead[c] |
|---|---|---|---|
| Dissolved $O_2$ in bulk liquid (ppm) | 8.5 | 7.8 | 7.4 |
| Biofilm thickness or radius (mm) | 0.4–1 | 3 | 1.5 |
| Depth of $O_2$ penetration (μm) | 150 | 135 | 150 |
| Relative volume free of $O_2$ (%) | 63–85 | 87 | 73 |

[a]Chen and Bungay, 1981[3];
[b]Huang and Bungay, 1973[4];
[c]Beunink et al., 1989[5].

This disadvantage of biofilms was exploited to develop a co-culture of a strict aerobe (Alcaligenes) with a facultative anaerobe (*Enterobacter cloacae*), both immobilized within Ca-alginate beads of ca. 3 mm of diameter (Beunink and Rehm, 1990)[6]. Both microorganisms which were initially distributed homogenously within the bead matrix, were rapidly shared out differentially amongst the inner and the outer space of the bead, due to the selective pressure exerted by the oxygen in the outer space, and its drastic limitation in the inner space. The authors showed that only this synergistic arrangement was able to completely degrade the 4-chloro-2-nitrophenol (CNP). Otherwise CNP is totally refractory to pure aerobic cultures of Alcaligenes alone, while in the presence of a pure anaerobic culture of Enterobacter alone, CNP transformation was limited to the 4-chloro-2-aminophenol. The nitro-group first had to be anaerobically reduced before dioxygenases of Alcaligenes were able to cleave the aromatic ring and proceed to its mineralization. Even though the application of this laboratory system at a large scale is questionable (use of pure strains; oxygen tolerance of the anaerobic species which is facultative; use of alginate beads as immobilization carriers), it represents an excellent model which demonstrates the interest of coupling reductive and oxidative catabolisms.

Other examples of mixed anaerobic/aerobic cultures are described in Gerriste et al 1990[7].

SUMMARY OF THE INVENTION

According to one aspect of the invention an apparatus for the continuous synchronous anaerobic/aerobic biotreatment of contaminated liquid waste is provided, comprising (a) a bioreactor,
(b) inlet means in said bioreactor for influent waste liquid,
(c) outlet means in said bioreactor for effluent treated waste liquid,
(d) conduit means outside of said bioreactor for connecting said inlet and outlet means to define a closed loop including said bioreactor,
(e) aerating means associated with said conduit means for injecting an oxygen-containing gas into said conduit means, whereby a controlled amount of oxygen is dissolved in said liquid waste outside of said bioreactor,
(f) integrated anaerobic/aerobic biofilm means in said bioreactor between said inlet and outlet means, said biofilm having an outer surface area and an inner core area and having a decreasing gradient of oxygen concentration toward said core area, the core area being substantially oxygen-free, and being further characterized by predominantly strict aerobic bacteria at said outer surface area, predominantly strict anaerobic bacteria at said core area and predominantly facultative anaerobic bacteria therebetween, and (g) pump means for cycling said waste liquid through the apparatus.

According to another aspect of the invention, a method for the continuous synchronous anaerobic/aerobic biotreatment of contaminated liquid waste is provided, comprising (a) providing a bioreactor containing an integrated anaerobic/aerobic biofilm, (b) oxygenating said waste liquid outside of said bioreactor to introduce into said waste liquid a controlled amount of dissolved oxygen, and (c) continuously cycling the oxygenated waste liquid through said bioreactor to remove said contaminants, wherein said biofilm comprises an outer surface area and an inner core area including a decreasing gradient of oxygen concentration toward said core area, the core area being substantially oxygen-free, and being further characterized by predominantly strict aerobic bacteria at said outer surface area, predominantly strict anaerobic bacteria at said core area and predominantly facultative anaerobic bacteria therebetween.

DESCRIPTION OF THE PREFERRED EMBODIMENT(S)

Figure 1:
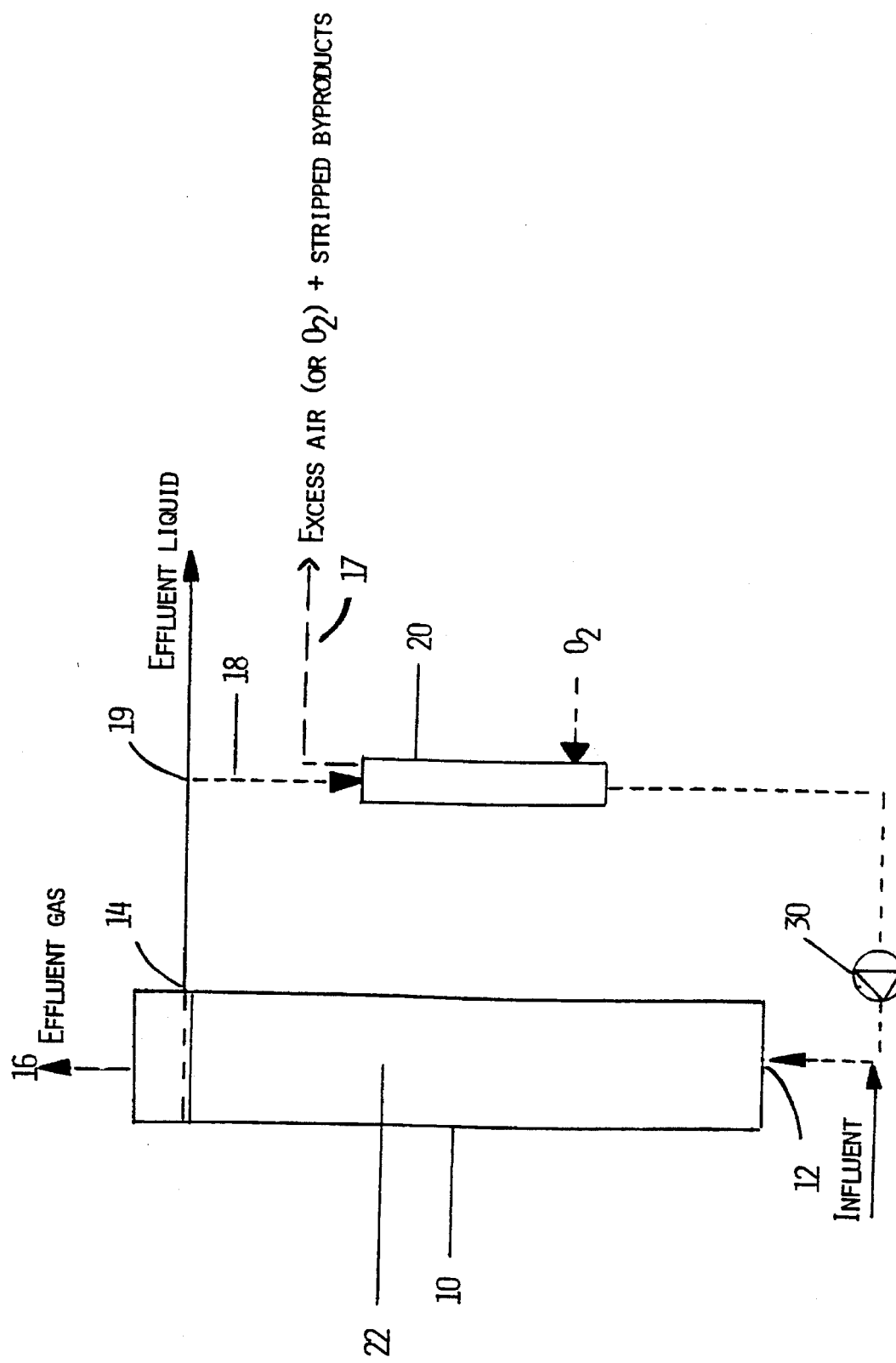
FIG. 1 is a flow diagram illustrating the operation of an apparatus according to the invention.

As seen in FIG. 1, where the solid lines represent liquid flow, the long broken lines represent gas flow, and the short broken lines represent re-circulation flow, the apparatus according to the invention comprises a bioreactor 10 of the upflow anaerobic sludge bed-type, although it will be appreciated that other forms may also be employed. Waste liquid influent inlet means 12 is provided at the lower end of the reactor, and waste liquid effluent outlet means 14 is provided at the upper end of the reactor. Effluent by-product gas (methane, carbon dioxide etc.) outlet 16 is also provided at the top of the reactor.

Conduit means 18 connects the inlet and outlet means to define a closed loop for circulating the waste liquid through the apparatus. De-contaminated effluent liquid is tapped off from the conduit means at 19.

Aerating means 20 is associated with the conduit means to inject an oxygen-containing gas, such as pure oxygen or air, into the conduit where it dissolves in the waste liquid. The amount of gas dissolved is controlled by conventional means (not shown), so that the amount of dissolved oxygen is kept below the rate of consumption by the bioreactor.

Outlet 17 for excess air (or $O_2$) plus stripped byproduct gas is also provided at the top of the aerating means.

An integrated anaerobic/aerobic biofilm means 22 is suspended in the bioreactor between the inlet and outlet means.

Figure 2:
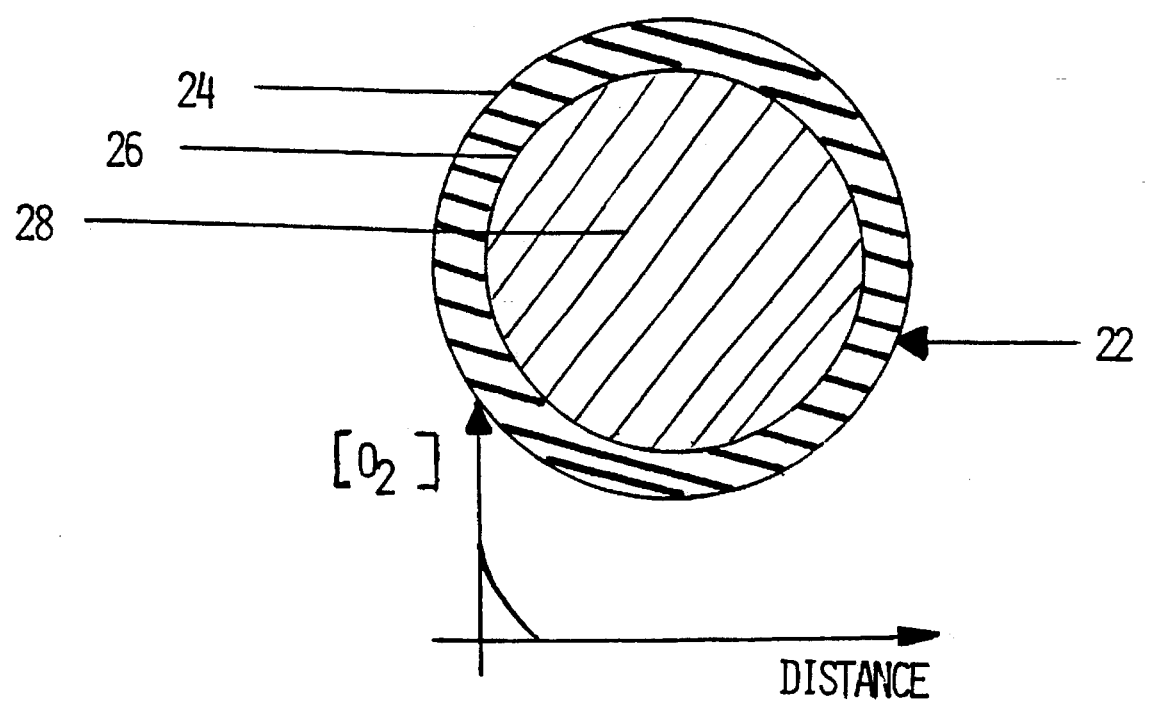
FIG. 2 is a cross-sectional schematic illustration of a biofilm according to the invention, including a graphical interpretation of the oxygen concentration gradient in the biofilm.

As best seen in FIG. 2, the biofilm 22 (maximum 100 mm, wherein <90% of biomass is aerobic granule size 3 mm) includes an outer surface area and an inner core area, and has a decreasing gradient of oxygen concentration toward the core area (see graph portion of FIG. 2) which is substantially oxygen-free. Predominantly, strict aerobic bacteria 24 are located at the outer surface area. Predominantly, strict anaerobic bacteria 28 are located at the core area, and predominantly facultative anaerobic bacteria 26 are provided therebetween, particularly near the outer surface.

Figure 2A:
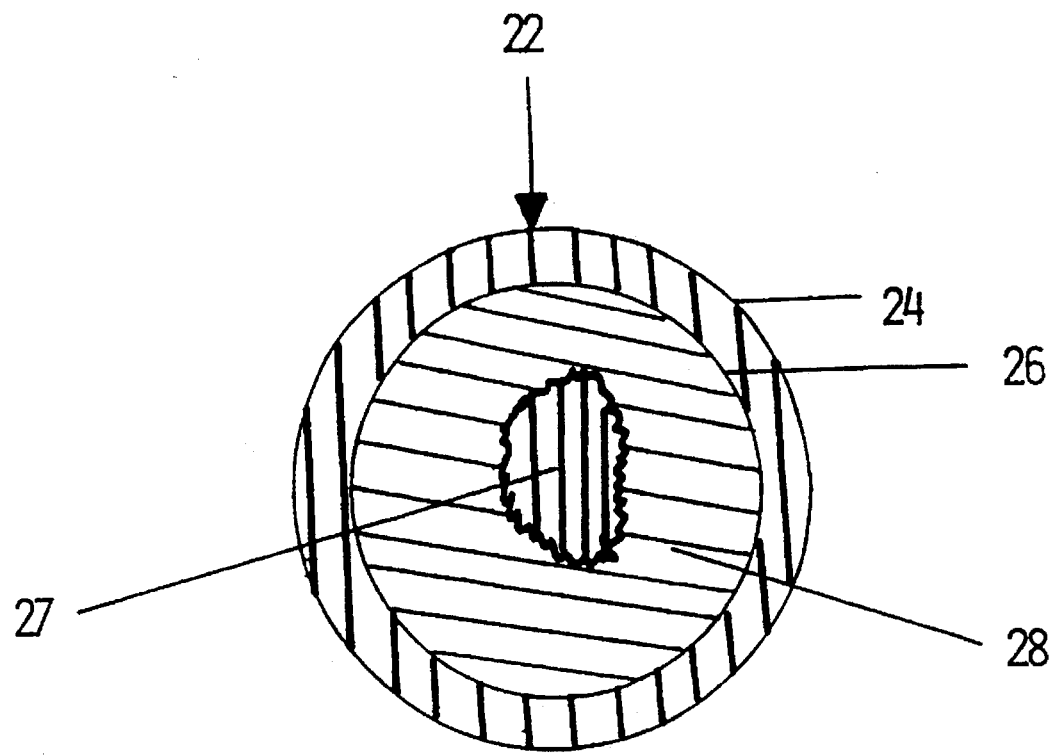
FIGS. 2A and 2B are cross-sectional schematic illustrations of other embodiment biofilms according to the invention.

As illustrated in FIG. 2A, the core area could alternatively include inert microcarrier 27 (such as particles of expanded clay, particles of expanded polyurethane, or any other suitable porous microparticle) which could nucleate the cell immobilization and stabilize the suspended biofilm.

Figure 2B:
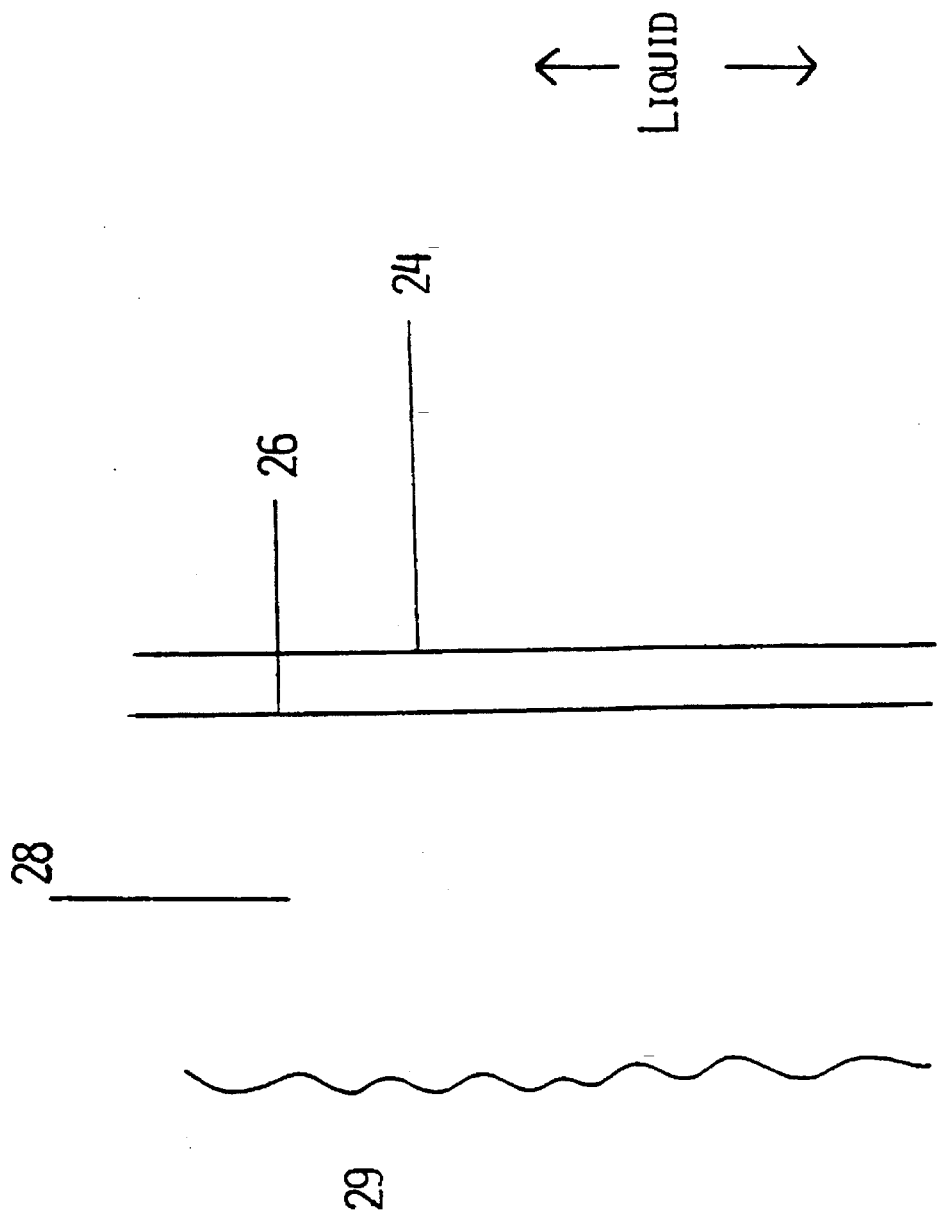

As seen in FIG. 2B, biofilm 22 could also be made of a fixed biofilm system, packed with fixed inert support 29 to develop a fixed anaerobic/aerobic biofilm.

Pump means 30 is associated with the conduit means to cycle the waste liquid through the apparatus.

Experimental

The first experiment presented here is to investigate whether anaerobic granules such as an anaerobic sludge granule bed, suspended in upflow anaerobic sludge bed-type reactors, can be operated in oxic environments. The major difference is that anaerobic granules contain large amounts of strict anaerobes such as acetogens and methanogens, which are highly sensitive to traces of oxygen. Carbohydrate-fed anaerobic granules, which can be several millimetres in diameter include a wide variety of bacterial trophic groups (acidogenic fermenters, sulphate-reducers, proton-reducing acetogens, hydrogenophilic and acetoclastic methanogens). In the recent past, we have, amongst others, evidenced a structured organization of the granule consortium, the core of the film of which is almost exclusively colonized by Methanothrix-like methanogens while outer surface layer contains a large variety of morphotypes including fermentative species. Consequently gradients of trophic activities within the biofilm were expected and have been experimentally evidenced.

To separately assess the specific activities of granule concentric portions, calibrated abrasions were sequentially processed on sucrose-fed granules to progressively strip their outermost biomass particles off. Large amounts of granules were submitted anaerobically to a controlled fluidization at a superficial liquid velocity of 30 m h$^{-1}$ in the presence of a mineral abrasive (sand particles sized between 60 and 180 μm, 20 g L$^{-1}$ sludge bed). Detached particles were separated from the residual granules and sand by gravity. Mass balances and activities were assessed on all abraded particles and on the residual granule cores at the end of the process.

Results on acidogenic activity gradients are presented in Table 2.

TABLE 2

PARTITION OF THE GLUCOSE SPECIFIC ACTIVITY
AS A FUNCTION OF THE GRANULE DEPTH

| Location | Layer Relative Mass (%) | Glucose specific activity (std. dev.) (mmol $g^{-1}$ VSS $d^{-1}$) |
|---|---|---|
| Outer | 34 | 12.3 (0.96) |
| Median | 23 | 4.8 (0.25) |
| Core | 43 | 1.3 (0.21) |

Average equivalent-diameter of granules: 1.95 mm ± 0.49. Reactor dilution rate: 1.9 $d^{-1}$. Organic loading rate: 3.7 g COD $L^{-1}$ $d^{-1}$. Specific substrate removal rate: 0.31 g COD $g^{-1}$ VSS $d^{-1}$. Substrate: sucrose added with $NH_4Cl$, $(NH_4)_2SO_4$, $NaH_2PO_4$, $K_2HPO_4$, $NaHCO_3$, $KHCO_3$, yeast extract and trace metals.

The first abrasion detached about 34% of the total biomass (on a dry weight basis), and the second one, 23% (corresponding respectively to a 14 and 13% decrease in diameter). The glucose specific activity drastically decreased when penetrating in the granule inner mass, indicating a clear predominance of fermentative (acidogenic) bacteria (partly facultative anaerobes) in the outer layer of the granule. Glucose specific activity was ten fold larger in the outermost layer than in the inner core. It was thus conceivable that the peripheral layer could easily shield the strict anaerobic granule core against detrimental effect of oxygen. This was also verified experimentally.

A reactor concept, illustrated in FIG. 1, was developed to couple reductive and oxidative degradation using anaerobic granules. The ultimate goal of such a process is to develop granular biofilm including aerobic, facultative and anaerobic populations, distributed in an arrangement such as illustrated in FIG. 2. These tailored biofilms could create a synergism between the population layers.

The liquid recirculation rate through the apparatus is adjusted to maximize the oxygen enrichment in the anaerobic liquid phase of the UBF reactor (high ratio of effluent recirculation to influent flow) and to minimize the methane loss by stripping within the aerated column. Suitable control of the oxygenation is required considering that the methane has to be recovered with a minimum of residual $O_2$ (e.g., injection of pressurized air or oxygen or injection of $H_2O_2$).

By way of further explanation, the rate of oxygen consumption by the biofilm is fixed (because limited) by oxygen supply rate and the efficiency of $O_2$ transfer from the gas to the liquid phase, which can vary from 5 to 15% as a function of the air or $O_2$ diffusion device which is utilized. These will be adjusted to have a rate of oxygen consumption by the biofilm which does not represent more than between 10 and 40% of the biodegradable COD loading rate (with influent). The liquid circulation rate through the apparatus will not influence the oxygen consumption by mircoorganisms. However, it will influence the location where the major consumption of $O_2$ takes place, and which must be in the reactor rather than in the aeration means. Accordingly, the location for major $O_2$ consumption will be the anaerobic/aerobic reactor if the liquid circulation rate is maximized.

Specifically, a significant supply of oxygen into the anaerobic granule bed has been conducted on a relatively long-term to test the anaerobic granule tolerance to oxygen. A UBF reactor was operated during 3 months with variable concentration of dissolved $O_2$ in the liquid recirculated at high rate through the granule bed of the UBF reactor: from traces up to 18 ppm. Organic feeding was made of a sucrose synthetic wastewater at an average OLR of 2.44 (±0.42) g COD $L^{-1}d^{-1}$ with a HRT of 1.1 (±0.07) d. Biomass content in the reactor ranged from 7.4 to 12 g VSS $L^{-1}$. It has been estimated that the granule bed had received over the 3 months of experimentation a total of ca. 10 g $O_2$ $L^{-1}$. Methane production rate fluctuated between 0.5 and 1 vol-(STP) $vol^{-1}d^{-1}$ (0.66 on average). Comparison of methanogenic activities before and after the period of oxygenation of the reactor showed that neither the acetoclastic nor the hydrogenotrophic methanogenic specific activities were affected by the continuous oxygenation of the reactor. In fact dissolved oxygen was never detected in the liquid supernatant above the granule bed. This indicated that the oxygen input was never exceeding the potential rate of consumption. Evidently, the $O_2$ consumption by the peripheral acidogens (facultative anaerobes) resulted in diffusional resistance to $O_2$ transfer and limited the penetration of $O_2$ towards the inner core of the granule bed to a short distance, if any. Hence, strict anaerobes in the granule core were shielded against oxygen. In contrast acetoclastic specific activity passed from 400 (±100) to 540 (±80) mg acetate $g^{-1}$ volatile suspended solid (VSS) $d^{-1}$ after 3 months of such a regime of oxygenated liquid feeding. Accordingly, the limitation in oxygen mass transfer in anaerobic systems may be used to extrapolate to the development of integrated anaerobic/aerobic biofilms.

Testing of a System for Aerobic and Anerobic Synchronous Treatment of PCP-Containing Wastewater The second experiment presented here investigates whether the FIG. 1 apparatus is appropriate for synchronous aerobic and anaerobic treatment of xenobiotics within a single system and whether anaerobic granules could provide a support matrix for peripheral colonization of (micro) aerobic microorganisms by limited oxygen supply in the granule bed. Anaerobic granules adapted for a long time to PCP-containing effluents have been tested for PCP degradation under both anaerobic (control) and combined anaerobic/aerobic conditions. Briefly, both anaerobic and integrated anaerobic/aerobic reactors were operated at 35° C. and fed with a mixture of sucrose, butyrate, ethanol and acetate at a constant loading rate of 1.41 (±0.23) g COD $L^{-1}d^{-1}$ on average in a first phase (day 1 to 56) and of 2.89 (±0.13) g COD $L^{-1}d^{-1}$ in a second phase (day 57 to 135). The synthetic feed was prepared with distilled water and supplemented with metal and nutrient salts free of chlorine. Also a constant HRT of 2.1 (±0.1) d on average was maintained during the experimentation period presented here i.e. 4.5 months. The PCP loading was gradually increased to reach at the present stage of the experiment values near 100 mg PCP $L^{-1}d^{-1}$. The oxygen fed to and consumed in the integrated anaerobic/aerobic reactor was on average ca. 60 mg $O_2$ $L^{-1}d^{-1}$ during the first phase and ca. 110 mg $O_2$ $L^{-1}d^{-1}$ in the second phase, i.e. ca. 4% of the COD-based OLR. Hence most of the carbon pollution had still to be anaerobically converted. Redox potential referred to hydrogen (Eh) was on average at the base of the granule bed −109 (±23) mV and above the bed −132 (±29) mV, in the coupled anaerobic/aerobic reactor, while $E_h$ was homogenously at −150 (±25) mV in the anaerobic system (at neutral pH and 35° C.). PCP removal was assessed from the balance between the measured PCP contents of influent and effluent and compared to the rate of discharge of inorganic chloride released with the effluent.

Figure 3:
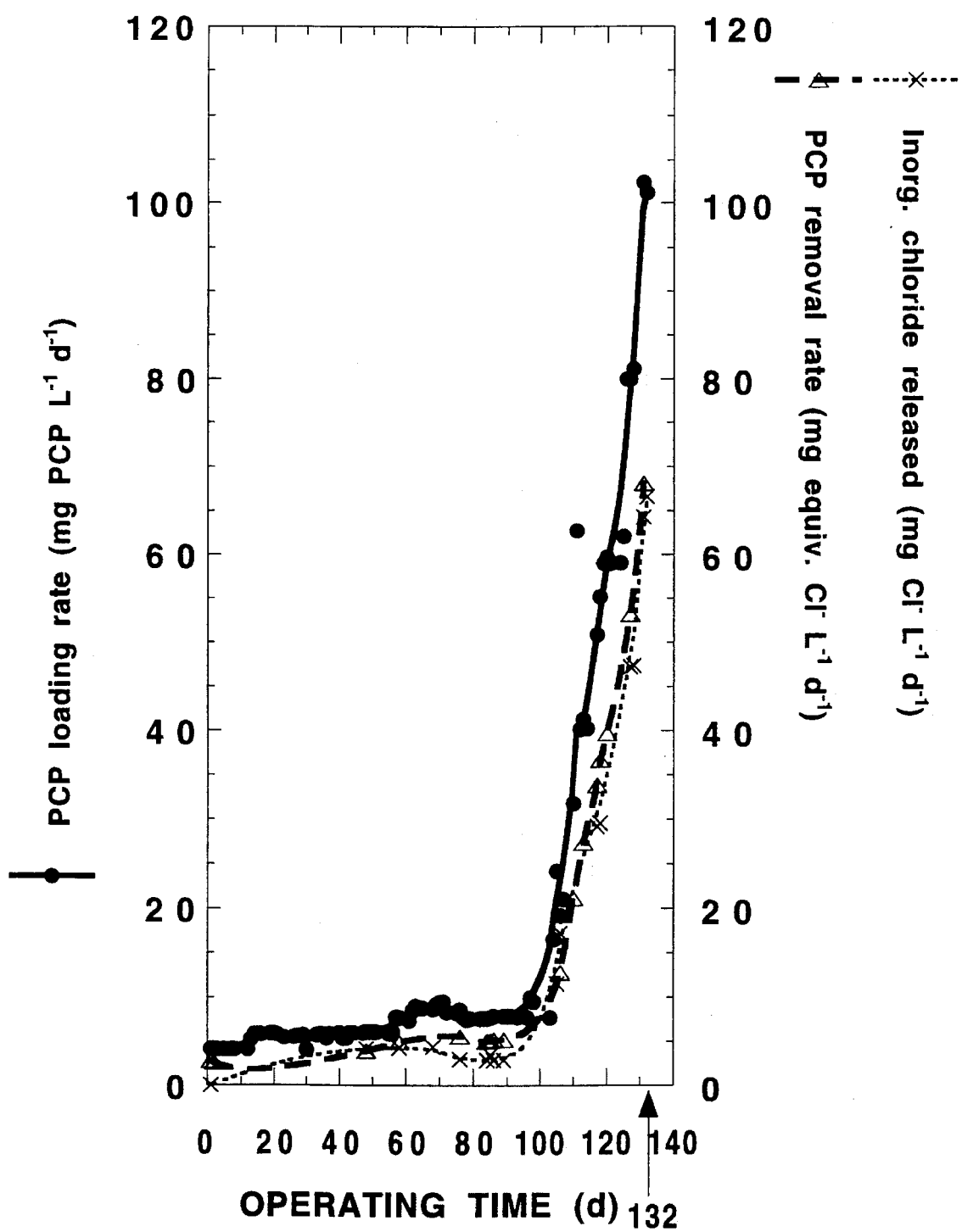
FIGS. 3 to 5 are graphs comparing the performance of an apparatus according to the invention, including an integrated anaerobic/aerobic biofilm, versus the same apparatus using an aerobic biofilm.
Figure 4:
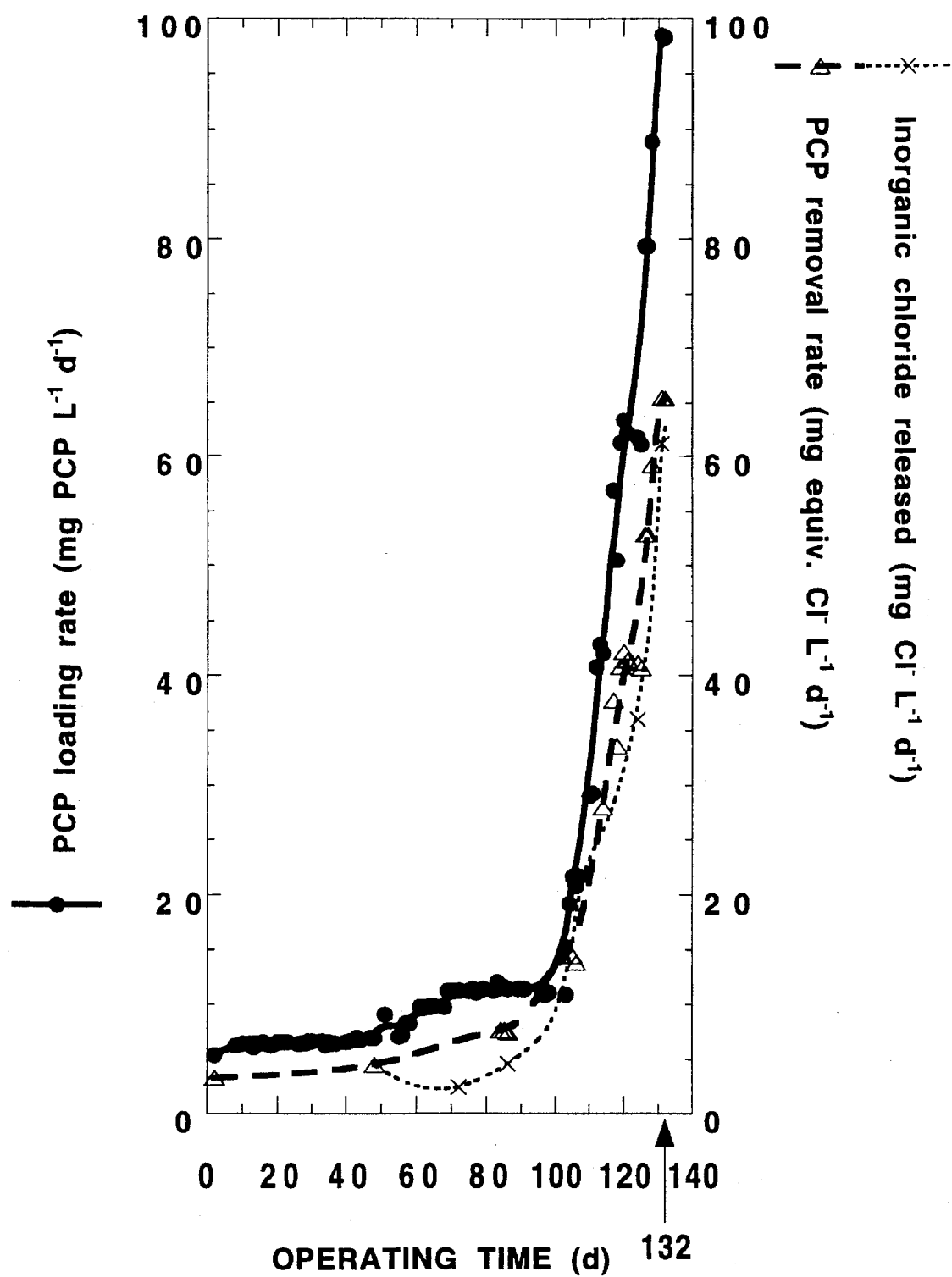
Figure 5:
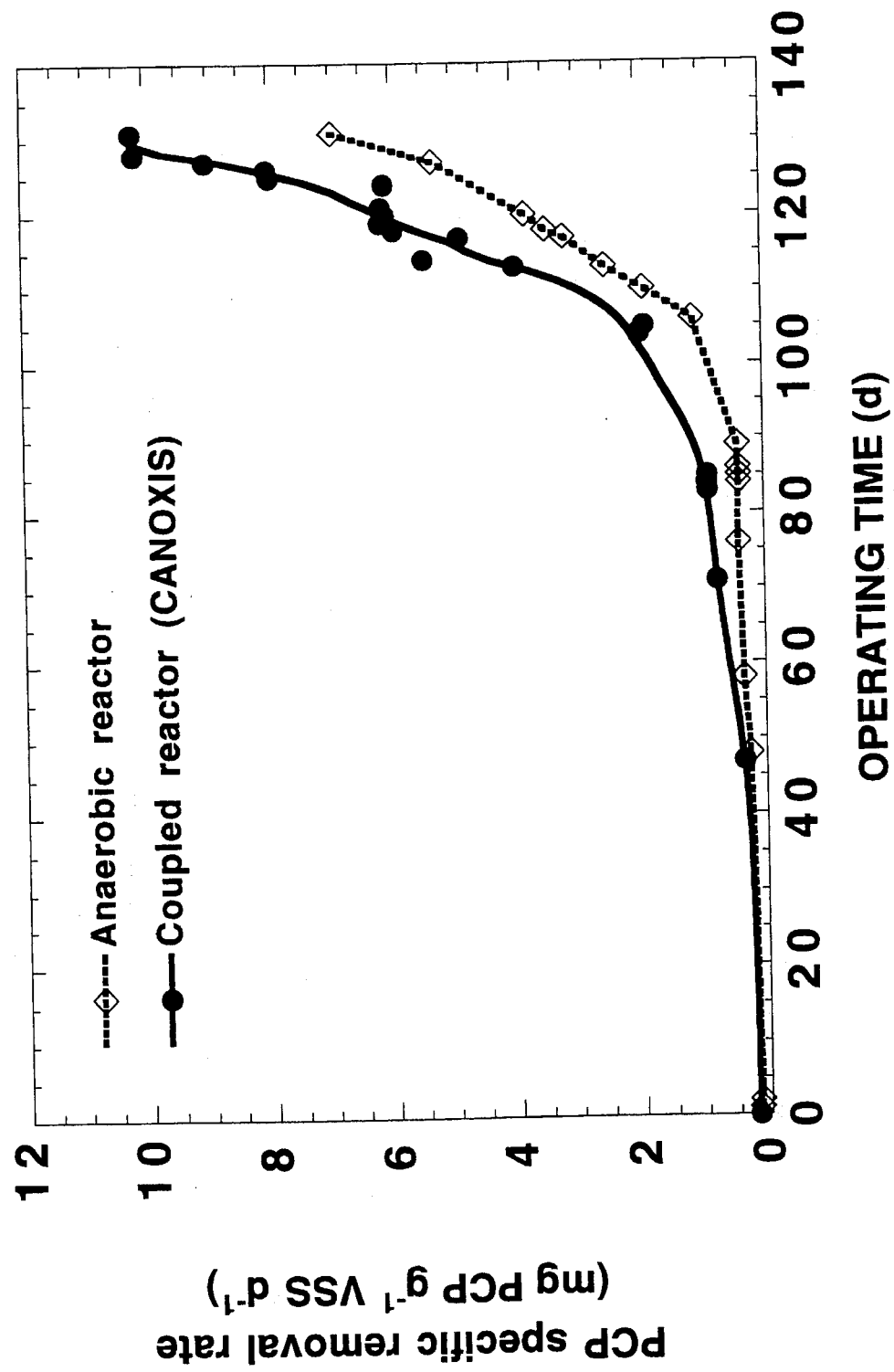

As shown in FIGS. 3 (aerobic reaction) and 4 (coupled anaerobic/aerobic reaction), perfect stoichiometry between PCP removed and chloride released indicated that PCP removal effectively resulted from biologically mediated completed dechlorination. In effect only traces of less chlorinated intermediaries were detected in the effluent, if any. We can see that at the present stage of the study both reactors were capable of degrading PCP at rates over 90 mg PCP $L^{-1}d^{-1}$. This is well comparable to the highest rate of dechlorination observed to date in the literature (Wu et al., 1993)[8]. However when PCP dechlorination rate was reported to the biomass content of reactors, coupled anaerobic/aerobic reactor showed specific rates superior to those of the anaerobic reactor: 10 against 7 mg PCP $g^{31\ 1}$ VSS $d^{-1}$, respectively, at the end of the experimental segment presented here (FIG. 5).

This was due to a lower biomass content in the coupled anaerobic/aerobic reactor (10 g VSS $L^{-1}$) than in the conventional anaerobic reactor (15 g VSS $L^{-1}$).

Even though these results suggest that the coupled anaerobic/aerobic reactor is significantly more efficient than the anaerobic one with regard to their PCP degradation function, since it is not known yet whether the reactors were transport or kinetics limited, at least it can be concluded that anaerobic/aerobic coupling is workable in a way that is transferable at large scale.

Methanogenic activity was not affected by the $O_2$ presence since $CH_4$ production rate of the coupled anaerobic/aerobic reactor during the second phase, was on average 0.49 (±0.16) vol(STP). $vol^{-1}d^{-1}$ against 0.60 (±0.16) in the conventional anaerobic reactor. The lower $CH_4$ production rate of the coupled anaerobic/aerobic reactor indicated that part of the co-substrates were effectively aerobically converted. This is consistent with aerobic growth observed in the granule bed. Counts of strict aerobic microorganisms on Plate Count Agar from representative sludge samples of both reactors revealed that the number of strict aerobic CFU (colony forming unit) was significantly higher in the coupled anaerobic/aerobic reactor than in the anaerobic one, $7.2 \cdot 10^9$ CFU $g^{-1}$ VSS against $3.5 \cdot 10^7$, respectively. Thus, the anaerobic granule bed seems able to be oxygen-fed and colonized by aerobic or microaerobic bacteria which, at larger PCP loading, could eventually contribute to the PCP degradation process.

Testing of a System for Aerobic and Anerobic Synchronous Treatment of Tetrachloroethylene-Containing Effluent The third experiment presented here investigates whether the FIG. 1 apparatus is appropriate for synchronous aerobic and anaerobic treatment of tetrachloroethylene (PCE) within a single system using anaerobic granule as a support matrix for juxtaposition of indigenous anaerobic microorganisms from the core of the granule with peripheral colonies of (micro)aerobic microorganisms grown due to limited oxygen supply in the granule bed.

In this experiment, suspended anaerobic granules in the synchronous aerobic and anaerobic system were operated under the extensive presence of up to 400 ppb of oxygen. PCE degradation has been tested at 35° C. within both coupled anaerobic/aerobic system and conventional upflow anaerobic sludge reactor (as control) for comparison. Sucrose, propionic acid and methanol were used as primary substrates. Both systems have shown excellent dechlorination capability. No vinyl chloride has been found in the liquid effluent. A summary of the results are presented in the Table 3 below. The operating and xenobiotic loading conditions are similar for the two systems. The specific (based on microorganism content) rate of PCE degradation is significantly improved within the anaerobic/aerobic system compared to this of the conventional anaerobic one (used as control). At steady state with the highest PCE loading (90 mg PCE/L.d), the anaerobic/aerobic coupled system had a specific PCD removal rate of 13 mg PCE/g VSS.d, against 7 mg PCE/g VSS.d, in the anaerobic one. In this experimental case, the reactors reached kinetics-limited states; thus it can be concluded that anaerobic/aerobic coupling is not only workable but also it has a great potential for being significantly more efficient than conventional anaerobic systems.

TABLE 3

Operational Conditions and PCE degradation results of the aerobic/anaerobic system (PCEO) compared to those of the conventional anaerobic system (PCEA)

| Phase/Reactor | COD LR (mg/g VSS-D) | Biomass (g VSS/L) | PCE influent (mg/L) | (mg/L-d) | PCE removal rate (mg/g VSS-d) |
|---|---|---|---|---|---|
| I/PCEA | 0.56 | 10.74 | 10.71 | 39.34 | 3.06 |
| PCEO | 0.59 | 6.65 | 10.26 | 38.91 | 5.26 |
| II/PCEA | 0.48 | 11.54 | 14.77 | 48.49 | 4.16 |
| PCEO | 0.67 | 7.23 | 12.83 | 46.36 | 6.42 |
| III/PCEA | 0.36 | 12.47 | 23.32 | 90.00 | 6.93 |
| PCEO | 0.50 | 7.05 | 22.39 | 93.00 | 12.66 |

COD LR = specific loading rate of COD (influent)
PCEA = anaerobic reactor (for control)
PCEO = aerobic/anaerobic system It will be apparent to those skilled in the art that the integrated anaerobic/aerobic (oxic) (synchronous) system for biotreatment of toxic wastes according to the invention may have many fields of application, such as:

pulp and paper CTMP effluents: resin acids, pulping Kraft bleachery effluents: chloro-phenols, chloro-lignins, groundwater (PCE, BTX) in "pump and treat" operations, coal refinery (phenolic compounds, cresols, aromatic acids, heterocyclic aromatics);

water soluble fraction of petroleum refinery wastes (BTS, phenols, naphatlenes, indoles), synthetic cutting fluid (polyglycols, glycol ethers, long-chain fatty acids, amine salts, alcohols), contaminated air from printing industry (solvents), and venting from contaminated soil piles.

REFERENCES

1. Verstraete, W., Huysman, F. and Top, E. (1990). How can biotechnology solve environmental problems of modern society. In: *Proc. of the 5th European Congress on Biotechnology*, Copenhagen, Denmark. Christiansen, C., Munck, L. and Villadsen, J. (Eds), Munksgaard, Copenhagen, Denmark, pp. 75–84.
2. Vochten, P., Schowanek, S., Schowanek, W. and Verstraete, W. (1988). Aerobic versus anaerobic wastewater treatment. In: *Proc. of the 5th Int. Symp. on Anaerobic Digestion*, Bologna, Italy. Hall, E. R. and Hobson, P. N. (Eds.), Pergamon Press, Oxford, UK, pp. 91–104.
3. Chen, Y. S. and Bungay, H. R. (1981). Microelectrode studies of oxygen transfer in trickling filter slimes. *Biotechnol. Bioeng.*, 23, 781–792.
4. Huang, M. Y. and Bungay, H. R. (1973). Microprobe measurements of oxygen concentrations in mycelial pellets. *Biotechnol. Bioeng.*, 15, 1193–1197.

5. Beunink, J., Baumgartl, H., Zimelka, W. and Rehm, H. J. (1989). Determination of oxygen gradients in single Ca-alginate beads by means of oxygen-electrodes. *Experientia*, 45, 1041–1047.

6. Buenink, J. and Rehm, H. J. (1990). Coupled reductive and oxidative degradation of 4-chloro-2-nitrophenol by a co-immobilized mixed culture system. *Appl. Microbiol. Bitechnol.*, 34, 108–115.

7. Gerritse, J., Schut, F. and Gottschal, J. C. (1990) Mixed chemostat cultures of obligately aerobic and fermentative of methanogenic bacteria grown under oxygen-limiting conditions. *FEMS Microbiol. Lett.*, 66, 87–94.

8. Wu, W. M., Bhatnagar, L. and Zeikus, J. G. (1993). Performance of anaerobic granules for degradation of pentachlorophenol *Appl. Environ. Microbiol.*, 59, 389–397.

I claim:

1. An apparatus for the continuous anaerobic/aerobic biotreatment of contaminated liquid waste, comprising (a) a bioreactor, (b) inlet means in said bioreactor for influent waste liquid, (c) first outlet means in said bioreactor for effluent treated waste liquid, (d) second outlet means in said bioreactor for effluent gas, (e) conduit means outside of said bioreactor for connecting said inlet and said first outlet means to define a closed loop including said bioreactor, (f) aerating means associated with said conduit means for injecting an oxygen-containing gas into said conduit means, whereby a controlled amount of oxygen is dissolved in said liquid waste outside of said bioreactor, (g) integrated aerobic/aerobic biofilm means in said bioreactor between said inlet and said first and second outlet means, said biofilm having an outer surface area and an inner core area and having a decreasing gradient of oxygen concentration toward said core area, the core area being substantially oxygen-free, and further comprising predominantly strict aerobic bacteria at said outer surface area, predominantly strict anaerobic bacteria at said core area and predominantly facultative anaerobic bacteria therebetween, and (h) pump means for cycling said waste liquid through the apparatus.

2. An apparatus according to claim 1, wherein the oxygen-containing gas is selected from the group consisting of air, oxygen and hydrogen peroxide.

3. An apparatus according to claim 1, wherein the amount of oxygen dissolved in said waste liquid is an amount up to the rate of consumption of oxygen by the biofilm.

4. An apparatus according to claim 1, wherein the waste liquid is water.

5. An apparatus according to claim 4, wherein the amount of dissolved oxygen is from traces to about 18 ppm.

6. An apparatus according to claim 4, wherein the liquid waste comprises contaminants which include those which are degradable by anaerobic bacteria to forms which are further degradable by aerobic bacteria to non-toxic forms.

7. An apparatus according to claim 6, wherein the contaminants include highly chlorinated organic compounds.

8. An apparatus according to claim 7, wherein the contaminants include PCP.

9. An apparatus according to claim 4, wherein the biofilm is in the form of a suspended granular anaerobic sludge bed colonized with aerobic bacteria.

10. An apparatus according to claim 9, wherein the average diameter of the granules is about 2 mm.

11. A method for the continuous synchronous anaerobic/aerobic biotreatment of contaminated liquid waste, comprising (a) providing a bioreactor containing an integrated anaerobic/aerobic biofilm, (b) oxygenating said waste liquid outside of said bioreactor to introduce into said waste liquid a controlled amount of dissolved oxygen in an amount up to the rate of consumption of oxygen by the biofilm, and (c) continuously cycling the oxygenated waste liquid through said bioreactor to remove said contaminants and collecting effluent by-product gas containing methane, wherein said biofilm comprises an outer surface area and an inner core area including a decreasing gradient of oxygen concentration toward said core area, the core area being substantially oxygen-free, and being further comprising predominantly strict aerobic bacteria at said outer surface area, predominantly strict anaerobic bacteria at said core area and predominantly facultative anaerobic bacteria therebetween.

12. A method according to claim 11, wherein the oxygen-containing gas is selected from the group consisting of air, oxygen and hydrogen peroxide.

13. A method according to claim 11, wherein the amount of oxygen dissolved in said waste liquid is adjusted to the rate of oxygen consumption by the biofilm, representing between 10 and 40% of the biodegradable chemical oxygen demand (COD) leading rate.

14. A method according to claim 11, wherein the waste liquid is water.

15. A method according to claim 14, wherein the amount of dissolved oxygen is from traces up to about 18 ppm.

16. A method according to claim 14, wherein the liquid waste comprises contaminants which include those which are degradable by anaerobic bacteria to forms which are further degradable by aerobic bacteria to non-toxic forms.

17. A method according to claim 16, wherein the contaminants include highly chlorinated organic compounds.

18. A method according to claim 17, wherein the contaminants include PCP.

19. A method according to claim 14, wherein the biofilm is in the form of a suspended granular sludge bed colonized with aerobic bacteria.

20. A method according to claim 19, wherein the average diameter of the granules is about 2 mm.

* * * * *

UNITED STATES PATENT AND TRADEMARK OFFICE
CERTIFICATE OF CORRECTION

PATENT NO. : 5,599,451
DATED : February 4, 1997
INVENTOR(S) : Serge R. Guiot

It is certified that error appears in the above-identified patent and that said Letters Patent is hereby corrected as shown below:

Claim 1,
(g) "integrated aerobic/aerobic", should read -- integrated anaerobic/aerobic --;

Claim 13,
"demand (COD) leading rate", should read -- demand (COD) loading rate --;

Claim 19,
""granular sludge bed", should read -- granular anaerobic sludge bed --.

Signed and Sealed this

Twenty-first Day of August, 2001

Attest:

*Nicholas P. Godici*

NICHOLAS P. GODICI
*Attesting Officer*  *Acting Director of the United States Patent and Trademark Office*